Patented Jan. 16, 1940

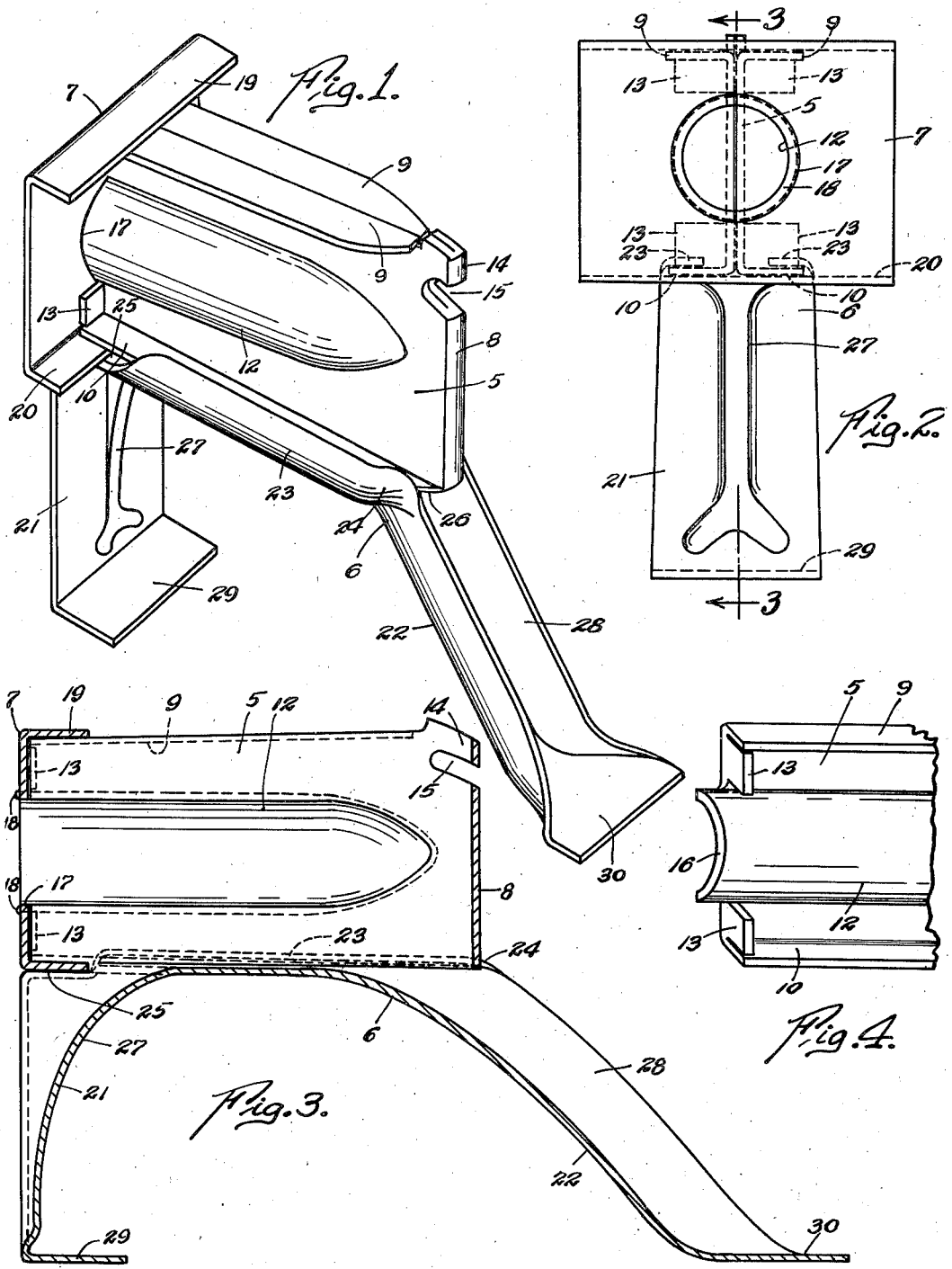

2,187,428

UNITED STATES PATENT OFFICE 2,187,428

LOAD TRANSMISSION DEVICE

Everett L. Mier, Chicago, and Burr C. Wilcox, Dundee, Ill., assignors to National Road Joint Manufacturing Company, Chicago, Ill., a corporation of Illinois Application December 12, 1938, Serial No. 245,154

7 Claims. (Cl. 94—8)

The present invention relates to a load transmission device for use in the building of roadways or the like, of concrete or other monolithic construction materials, and wherein adjacent slabs must be tied together in order to preclude displacement from an initial level or planar relationship.

An object of the invention is to provide an improved form of load transmission device of the character referred to, which is of extremely simple design, and constructed of a few sheet metal stampings instead of being cast or molded, thereby effecting a substantial saving in the cost of manufacture, and eliminating breakage losses, and losses due to casting imperfections.

Another object of the invention is to provide a novel design of load transmission device which may be rapidly assembled from sheet metal stampings, and without the use of welds, rivets, bolts or other separate fastening devices.

A further object is to provide a novel construction scheme in the manufacture of sheet metal load transmission devices, wherein factory scraps may be utilized to advantage with a substantial saving of labor and material costs.

Another object is to provide a novel assembly of parts in a sheet metal load transmission device, whereby the entire assembly may be locked together by means of a single peening, rolling, or pressing operation performed on but one of the constituent parts thereof, at a great reduction of expense.

The foregoing and other objects are attained by the means described herein and disclosed in the accompanying drawing, in which:

Fig. 1 is a perspective view of the new sheetmetal load transmission device of the invention, as seen from the rear.

Fig. 2 is a front view of the device.

Fig. 3 is a cross-sectional view taken on line 3—3 of Fig. 2.

Fig. 4 is a fragmental perspective view of the forward end of one pressed metal part of the device.

The load transmission device as known in the art of concrete or monolithic construction, is that portion of a road joint structure which furnishes a connection between adjacent individual slabs so as to preclude shifting or settling of one slab relative to the other, from the initial coplanar relationship. The complete load transmission structure generally includes a series of heavy metal dowels extending in a common direction within the material of the adjacent slabs, at the expansion or contraction joint, and said dowels are usually housed in metallic supports that are embedded in the concrete or other road material. The dowels generally and preferably are longitudinally shiftable relative to said supports, to compensate for expansion and contraction of the slabs occurring due to changing weather or temperatue conditions. It is the metallic dowel support that forms the subject matter of the present invention.

As stated earlier herein, the dowel support or load transmission device heretofore was a casting which had various disadvantages and insufficiencies, which, by means of the present invention, are effectually obviated. The load transmission device or dowel support of the present invention is a sheet metal stamped or pressed construction of simple and inexpensive design. The particular manner in which this improved device is quickly built up from sheet metal parts having certain structural cooperative features, is of considerable importance and advantage, and forms part of the invention also.

With reference to the accompanying drawing, it should first be noted that the entire device is constituted of but three stampings or sheet metal parts 5, 6, and 7. The part 5 may be considered the bearing body, the part 6 the stool portion, and the part 7 the interlock plate, or the front plate of the device. It is noteworthy that the parts mentioned are so coordinated structurally, that they are held assembled without the use of any separate fastening means such as bolts, rivets, clamps or welds. It is for this reason, at least in part, that the assembly is rapid and inexpensive, and therefore of material advantage in the manufacture of the improved load transmission device.

Attention is first directed to the bearing body 5 which is adapted to receive the usual dowel element of the road joint. This body part comprises a single stamping of sheet metal folded upon itself at the back or rear edge 8 so that its forward ends extend toward the interlock plate 7. The opposite sides of the bearing body are identical, and each comprises an upper laterally extending flange 9, a lower laterally extending flange 10, a laterally pressed half-cylinder 12, and a series of plate abutments 13 at the forward end of each side. The rear ends of all the flanges, and particularly those of the lower flanges 10, are tapered or converged toward the fold 8 at the back of the bearing body, to provide stops or abutments precluding shifting of the bearing body along the stool portion 6, as will more clearly become evident as the description proceeds. If desired, the upper portion of the rear end 8 may be provided with a hook 14 and slot 15, furnishing an anchor means whereby the load transmission device may be wired to adjacent elements of an expansion joint structure, or to a shipping crate. The half cylindrical depression 12, which extends lengthwise of the body 5 and forms half of a dowel socket, preferably has a substantial bullet shape, the front end thereof being open and straight. As shown in Fig. 4, the half cylindrical portion has an arcuate edge 16 which extends forwardly of the flanges and the abutments 13, for a distance exceeding slightly the thickness of the interlock plate, so that the aperture 17 of said plate may receive the extension 16 of both bearing body sides, the extensions projecting therethrough sufficiently to enable their being peened over or rolled upon the flat front face of the plate or forcibly pressed through the aperture 17, thereby to permanently and securely join the plate and the bearing body at the location 18. The connection through the plate aperture performs the additional function of holding the opposite sides of the bearing body in substantial flatwise abutment, preventing spreading of the dowel socket or bearing. The plate, therefore, acts as a collar upon which various lateral stresses and strains are distributed. The stops 13 and the forward edges of the flanges 9—9 and 10—10 back up the interlock plate and determine its position upon the bearing body 5.

In order that the plate 7 may tightly fit the body 5, the upper flanges 9 and the lower flanges 10 are made non-parallel, that is, the upper flanges incline toward the rear of the body, and the lower flanges decline in the same direction (see Fig. 3). Accordingly, the embrace of the plate flanges 19 and 20 upon the flanges 9 and 10 of the body 5, is rendered forceful and inducive of a tight and durable assembly, by the resultant wedging action.

The interlock plate will be seen to include, preferably, a pair of rearwardly extending horizontal flanges 19 and 20 which embrace between them the upper and lower flanges of the bearing body. This disposition of the various flanges results in a rigid and durable assembly.

Attention is now directed to the stool portion 6 which is a single stamping developed into a front leg or standard 21, a rear leg 22, and an intermediate substantially horizontal lap-channel portion 23 providing a guideway into which the flanges 10 of the bearing body may be slid for attachment of the bearing body to the stool portion without the use of separate fastening devices such as bolts, rivets, or welds. Where the rear leg 22 meets the channel portion at 24, the channel is constricted in width so as to limit the rearward movement of the body 5 in the direction of the rear leg 22. In attaching these parts, the forward end of channel portion 23 is slid onto the rear end of flanges 10—10 of the body sides, until the upper end portion 25 of the front leg passes beneath the flange 20 of the interlock plate 7, when the frictional engagement of the parts 20 and 25 sets up a yielding resistance to further sliding movement of the flanges 10 in the guideway 23. The resistance to final positioning of the stool portion may be overcome by a hammering or pressing operation, which drives the seat 25 under the flange 20 and the rear tapered ends 26 of flanges 10 into the constrictions at 24 of each channel part 23. It will be understood, of course, that the tightness with which the stool parts engage the bearing body and the interlock plate may be increased to the extent that a machine operation might be necessary for joinder of the parts, or if desired, the parts may fit rather loosely and be tightened after assembly by a press or hand hammer operation. Preferably, however, the fittings at 24 and 25 are just snug enough to enable hand assembly, with a final hammer blow required to set the parts permanently in the assembled relationship. The assembly thereby is rendered rapid and simple without the need for a machine operation.

To impart the necessary strength to the stool portion, it may be ribbed as at 27 and channeled as at 28. Suitable feet or bases 29 and 30 may be furnished on the legs 21 and 22 as an aid in maintaining the device in upstanding position upon the bed of the roadway or other construction project, while supporting an expansion or contraction joint structure in position for pouring of the concrete. The various flanges, channels, and extensions, in addition to performing the function of enabling rapid assembly and a durable construction of the load transmission device, serve also as excellent means of affording an effective bond with the concrete poured thereabout.

In applying the interlock plate to the bearing extensions 16 of the body 5, the peening or rolling operation may be dispensed with by reducing the diameter of the plate aperture 17 to such an extent as to enable the use of a pressed fit of the extensions 16 therein. Various other modifications and changes in the structural details may be made, within the scope of the appended claims, without departing from the spirit of the invention.

What is claimed is:

1. A device of the class described, comprising a metallic sheet formed to provide a body having a dowel socket portion including a forward extension, and pair of mounting flanges, a front plate apertured to snugly receive the forward extension of the dowel socket portion, and a stool section of sheet metal formed to provide a supporting leg and a channel in which the mounting flanges of the body are received to maintain an assembled condition of the parts.

2. A device of the class described, comprising a metallic sheet formed to provide a body having a dowel socket portion including a forward extension, and a pair of mounting flanges, a front plate apertured to snugly receive the forward extension of the dowel socket portion, and a stool section of sheet metal formed to provide a supporting leg and a channel in which the mounting flanges of the body are received to maintain an assembled condition of the parts, and a wedge means on the front plate forced between the supporting leg of the stool portion and the mounting flanges of the body, for binding the flanges in the channel of the stool portion.

3. A device of the class described comprising in combination, a strip of sheet metal folded upon itself transversely to provide a pair of body sides, each of said sides being pressed lengthwise to form half of a dowel supporting socket, said halves being in registry to furnish a complete socket open at one end, an upper flange and a lower flange on each body side, extended outwardly to overhang the socket halves, said upper and lower flanges being convergent toward the open end of the socket, an apertured front interlock plate including upper and lower flanges wedged over the convergent upper and lower flanges of the body sides, the aperture of said interlock plate registering with the open end of the dowel socket, and a stool for supporting the dowel socket body and its interlock plate, said stool including a leg standard and a channel, the channel supporting therein the lower extending flanges of the body sides.

4. A device of the class described comprising in combination, a strip of sheet metal folded transversely to provide a pair of body sides in flatwise contact, each of said sides being formed with a longitudinal depression forming half of a dowel supporting socket, said halves being in registry and extended beyond the body sides to form a complete dowel socket with a forward extension thereon, a flange on each body side extended outwardly and beneath the socket halves aforesaid, an apertured front interlock plate disposed substantially at right angles to the dowel socket axis, and having the forward extensions of the dowel socket halves received in the aperture thereof to preclude separation of the body sides, and a stool including a longitudinal channel of a width sufficient to receive the outwardly extended flanges of the body sides therein.

5. A device of the class described comprising in combination, a strip of sheet metal folded upon itself transversely to provide a pair of body sides, each of said sides being pressed lengthwise to form half of a dowel supporting socket, said halves being in registry to furnish a complete socket open at one end, an upper flange and a lower flange on each body side, extended outwardly to overhang the socket halves, said upper and lower flanges being convergent toward the open end of the socket, an apertured front interlock plate including upper and lower flanges wedged over the convergent upper and lower flanges of the body sides, the aperture of said interlock plate registering with the open end of the dowel socket, and a stool for supporting the dowel socket body and its interlock plate, said stool including a leg standard and a channel, the channel supporting therein the lower extending flanges of the body sides, and a constricted seat portion at the upper extremity of the leg standard for snugly receiving between it and said lower extending flanges the lower flange of the interlock plate.

6. A load transmission device for expansion joints, comprising a stool including divergent depending legs and an intermediate channel portion, a separate body portion including a dowel socket and a flanged lower edge for reception in the channel of the stool whereby to join the stool and the body portion, and a separate interlock plate including a dowel socket aperture in registry with the dowel socket of the body portion, and means wedging the interlock plate relative to the stool and the body portion.

7. A load transmission device for expansion joints, comprising a stool element including a pair of legs and an intermediate leg-connecting portion, said portion having an integral channel formed thereon, and a dowel support body of sheet metal strip formation, said strip being folded upon itself transversely to provide a pair of body sides flatly abutting, each of said sides being pressed outwardly lengthwise to form half of a dowel socket, the halves being in registry to furnish a complete socket, and a flange formed on each body side and extended outwardly therefrom to engage and lock in the channel of the stool element.

EVERETT L. MIER.
BURR C. WILCOX.